United States Patent [19]

Fisk

[11] Patent Number: 4,663,475

[45] Date of Patent: May 5, 1987

[54] ETHYLENICALLY UNSATURATED N-(HALOSULFONYL) CARBAMYL MONOMERS

[75] Inventor: Thomas E. Fisk, Midland, Mich.

[73] Assignee: The Dow Chemical Company, Midland, Mich.

[21] Appl. No.: 674,195

[22] Filed: Nov. 23, 1984

Related U.S. Application Data

[62] Division of Ser. No. 472,533, Mar. 7, 1983, Pat. No. 4,500,675.

[51] Int. Cl.$^4$ ............... C07C 125/03; C07C 125/06; C07C 125/065; C07C 125/067
[52] U.S. Cl. .................. 560/137; 560/132; 560/148; 260/543 R
[58] Field of Search ............ 560/148, 132, 137; 260/543 R

[56] References Cited

U.S. PATENT DOCUMENTS 4,119,510  10/1978  Williams .................. 560/148
4,390,645   6/1983  Hoffman et al. ............ 521/137

OTHER PUBLICATIONS

Chemical Abstracts, vol. 72, 1970, 78967b.

*Primary Examiner*—Allan M. Lieberman

[57] ABSTRACT

Ethylenically unsaturated N-(halosulfonyl) carbamyl compounds which are the reaction products of an ethylenically unsaturated compound having at least one active hydrogen moiety and a halosulfonylisocyanate. Such compounds can be polymerized in a solvent to produce stable polymer dispersions for use in, for example, polyurethane foams.

3 Claims, No Drawings

ETHYLENICALLY UNSATURATED N-(HALOSULFONYL) CARBAMYL MONOMERS

This is a divisional of application Ser. No. 472,553, filed Mar. 7, 1983, now U.S. Pat. No. 4,500,675.

BACKGROUND OF THE INVENTION

The present invention relates to copolymer dispersions having excellent particle size distribution and to polyurethanes prepared by reacting these dispersions with reactive polyisocyanates.

Polyurethanes constitute a broad class of polymeric materials having a wide range of physical characteristics. The polymers are produced by the reaction of a polyisocyanate with a polyfunctional compound having an active hydrogen in its structure. This active hydrogen compound is generally a liquid or solid capable of being melted at relatively low temperatures. Most commonly, the active hydrogen compound contains hydroxyl the moieties having the active hydrogen and thus are termed polyols, e.g., the polyols of polyesters, polyester amides, or polyethers, or mixtures of two or more such materials. For reasons of commercial availability and cost, the polyols most commonly employed in the preparation of polyurethanes are the polyethers having hydroxyl terminated chains and hydroxyl terminated polyesters.

Although a wide variety of physical and chemical properties are obtainable by the proper selection of a polyisocyanate and the polyol as well as the conditions under which the polyurethane reaction is carried out, the resulting polyurethane often exhibits properties such as load bearing and processability, particularly foam applications, unacceptable for some applications.

To improve such properties, it has been the practice of the art to employ graft copolymer dispersions (often called polymer polyols) prepared from vinyl monomers and polyols in the preparation of polyurethanes as shown in U.S. Pat. Nos. 3,383,351; 3,304,273; 3,523,093; 3,652,639 and 3,823,201. In 3,304,273, a mixture of styrene and a polar monomer are copolymerized while dispersed in a polyol which is essentially free of ethylenic unsaturation. Unfortunately, stable dispersions cannot be prepared by this technique if high proportions of styrene monomer are employed. Subsequently, in order to overcome this problem, it was found desirable to employ polyols which contain a significant amount of ethylenic unsaturation. As shown in U.S. Pat. No. 3,823,201, such unsaturation was advantageously introduced by reacting the polyol with an organic compound having both ethylenic unsaturation and hydroxyl, carboxyl or epoxy moieties which are reactive with the active hydrogen moiety of the polyol. While these more improved graft copolymer dispersions solve many of the problems confronting the polyurethane art, more efficient control of particle size of the disperse phase is desired for many applications.

Accordingly, it is highly desirable to provide an improved, low viscosity copolymer dispersion wherein less unsaturated moiety is required in the polyahl in order to achieve the desired particle size and particle size distribution in the dispersion.

SUMMARY OF THE INVENTION

In one aspect, the present invention is an ethylenically unsaturated N-(chlorosulfonyl)carbamyl monomer which is the reaction product of an ethylenically unsaturated compound having at least one active hydrogen moiety and chlorosulfonylisocyanate. In another aspect, the present invention is an ethylenically unsaturated N-(chlorocarbonyl)carbamyl monomer which is the reaction product of an ethylenically unsaturated compound having at least one active hydrogen moiety and chlorocarbonylisocyanate.

In yet another aspect, the present invention is a stable improved copolymer dispersion which comprises:
(A) a polyahl having dispersed therein;
(B) an addition copolymerizate of (1) a monomeric adduct of (a) an active ethylenically unsaturated N-(chlorosulfonyl)carbamyl monomer or an active ethylenically unsaturated N-(chlorocarbonyl)carbamyl monomer (hereinafter such monomers are called "carbamyl monomers") and (b) a monoahl or a polyahl with (2) at least one other ethylenically unsaturated monomer (hereinafter called "other monomer"); or
(C) a polymeric adduct of (1) an addition copolymer of a carbamyl monomer with at least one other ethylenically unsaturated monomer and (2) a monoahl or polyahl; or
(D) a mixture of (B) and (C); or
(E) a mixture of (B) and/or (C) and a polymer of at least one other ethylenically unsaturated monomer;
provided that in the copolymer dispersion, the mole ratio of polymerized carbamyl monomer to monoahl or polyahl is at least about 0.001:1 and is less than an amount at which gelation occurs. For the purposes of this invention, a "monoahl" is a polyfunctional compound wherein one of the functional groups is an active hydrogen moiety capable of reacting with an isocyanate moiety to form a urethane or similar moiety. For the purposes of this invention, a "polyahl" is a polyfunctional compound wherein at least two of the functional groups are active hydrogen moieties capable of reacting with an isocyanate moiety to form a urethane or similar moiety. In addition, the terms "dispersed" or "dispersion" as used herein are generic to include dispersions wherein the disperse phase constitutes colloidal size particles as well as true solutions wherein the disperse phase is at the molecular level.

Surprisingly, the copolymer dispersions of the present invention exhibit excellent stability even at relatively low molar ratios of ethylenically unsaturated moieties to polyahl. Even more surprising is the excellent control over particle size and particle size distribution achieved in said dispersions.

This invention, in another aspect, is a method for making the aforementioned copolymer dispersion. In yet another aspect, this invention is a polyurethane composition, preferably in the form of a foam, prepared from the copolymer dispersion as well as a method for reacting the copolymer dispersion with polyisocyanate to form polyurethane foams and other polyurethane compositions.

The copolymer dispersions of the present invention are usefully employed in the production of a wide variety of polyurethane products including cellular polyurethanes, polyurethane films and coatings as well as cast or molded articles of such polyurethanes. As used herein, the term "polyurethane" is to be broadly construed to include the polymeric reaction products of isocyanates with polyahls as hereinbefore defined.

DETAILED DESCRIPTION OF REPRESENTATIVE EMBODIMENTS

The polyahl suitably employed in the practice of this invention includes any organic compound having at least two active hydrogen moieties wherein the compound has a number average molecular weight ($M_n$) of at least about 60. Preferably, the polyahl is a polymer having of $M_n$ at least 200 and at least three repeating units of a monomeric moiety. For the purposes of this invention, an active hydrogen moiety refers to a moiety containing a hydrogen atom which, because of its position in the molecule, displays significant activity according to the Zerewitnoff test described by Woller in the *Journal of the American Chemical Society*, Vol. 49, page 3181 (1927). Illustrative of such active hydrogen moieties are —COOH, —OH, —NH$_2$, —NH—, —CONH$_2$, —SH and —CONH—. Typical polyahls include polyols, polyamines, polyamides, polymercaptans and polyacids. Of the foregoing polyahls, the polyols are preferred. Examples of representative polyahls which are suitably employed in the practice of this invention are disclosed in U.S. patent application Ser. No. 097,070, filed Nov. 23, 1979, which is incorporated herein by reference.

Examples of suitable monoahls include monohydric polyethers and monohyric polyesters which are similar in all respects to such polyols as defined hereinbefore except that monofunctional initiators such as monohydric alcohols are used as polymerization initiators instead of the polyfunctional initiators used to initiate polyol polyethers and polyol polyesters. Exemplary monohydric initiators include methanol, ethanol, butanol, and monohydric glycol ethers such as tripropylene glycol methyl ether, as well as phenols, acids, mercaptans, and the like. Other suitable monoahls include monohydroxyl epoxy resins, monohydroxyl polyurethane polymers, monohydroxyl phosphorus compounds, alkylene oxide adducts of monohydric thioesters including polythioethers, monohydric acetals including polyacetals, as well as monomercaptans, N-methylol amides, monoamines, and other compound which are similar to the aforementioned polyahls except that they contain only one active hydrogen moiety. Of the foregoing monoahls, the monohydric polyethers are preferred.

For the purposes of this invention, the term "active ethylenically unsaturated N-(chlorosulfonyl) carbamate" or "active ethylenically unsaturated N-(chlorocarbonyl)carbamyl monomer" means a monomer having a N-(chlorosulfonyl)carbamyl or N-(chlorocarbonyl)carbamyl group and an ethylenically unsaturated group capable of undergoing free radical initiated addition polymerization as readily as an $\alpha,\beta$-ethylenically unsaturated N-(chlorosulfonyl)carbamyl or N-(chlorocarbonyl)carbamyl, preferably as readily as acryloyl. As previously noted, said monomers will be referred to as "carbamyl monomers."

Representative carbamyl monomers included in the present invention are most advantageously represented by the formula:

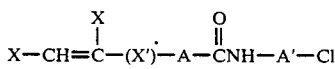

wherein each X is individually hydrogen, lower alkyl, halo-substituted alkyl, arylene, and the like; and X' is a suitable connecting fragment such as alkylene, aryl, or fragments such as those represented by the formulas:

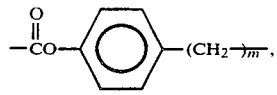

wherein m is a whole number preferably from about 1 to about 6; and the like. Alternatively, X' can be absent. A is —O—, —S—, =N—, or

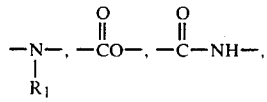

or the like, wherein $R_1$ is hydrogen or alkyl; preferably A is —O—; A' is —SO$_2$— or —CO—. The terminology "each X is individually" means that the X groups in a particular monomer molecule can be the same or different.

The carbamyl monomer of this invention is prepared by slowly adding an ethylenically unsaturated compound having at least one active hydrogen moiety, which moieties have been described hereinbefore, to a halosulfonylisocyanate or a halocarbonylisocyanate. Although halo can be fluoro, chloro or bromo, chloro is most preferred. Advantageously, the reaction mixture is cooled during the time the reactants are mixed. The resulting product can be distilled, preferably under vacuum, in order to further purify the product. The mole ratio of isocyanate to active hydrogen moiety can range from about 1:1 to a large excess of isocyanate, with a mole ratio of about 1:1 being most preferred. The ethylenically unsaturated compound containing active hydrogen moiety can vary. While virtually any vinyl functional alcohol can be employed herein, the hydroxyalkyl acrylates, hydroxyalkyl methacrylates, and hydroxyaryl acrylates are most preferred. Vinyl functional diols can also be employed.

The adduct of monoahl or polyahl and carbamyl monomer is the reaction product resulting from the reaction of an active hydrogen moiety of a monoahl or polyahl with the chlorosulfonyl or chlorocarbonyl moiety of an active ethylenically unsaturated carbamyl moiety. The adduct is advantageously compatible with the polyahl which is the continuous phase of the copolymer dispersion. By "compatible with" is meant that the adduct is either soluble in or dispersible in the polyahl. Typically, the adduct has a polymer backbone corresponding to the polymer backbone of the monoahl or polyahl and at least one pendant ethylenically unsaturated group. When the monoahl is a monool or the polyahl is a polyol, the linkage is represented by the formula:

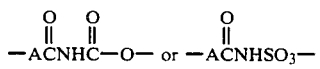

A is as defined previously. When the monoahl is a monoamine or the polyahl is polyamine, the linkage is a urethane linkage represented by the formula:

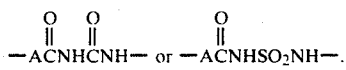

The more preferred adducts employed in the present invention are those represented by the formula:

$$Y-(R'''A''-_mR'''-Z]_x$$

wherein each A'' is individually —O—, —S— or

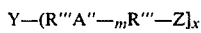

wherein $R_1$ is hydrogen or alkyl; preferably A'' is —O—; Y is hydroxyl, oxyhydrocarbyl, oxycarbonylhydrocarbyl, an α,β-ethylenically unsaturated moiety linked to the remaining portion of said adduct through a

type linkage, or a residue of an active hydrogen initiator suitably employed in preparation of a polyether; each Z is individually hydroxyl, oxyhydrocarbyl, oxycarbonylhydrocarbyl or said α,β-ethylenically unsaturated moiety provided that the polyether contains at least one α,β-ethylenically unsaturated moiety; each R''' is individually alkylene, hydroxyalkylene, aminoalkylene-, alkoxyalkylene, aryloxyalkylene, arylalkylene, hydroxyalkylalkylene, hydroxyarylalkylene, or haloalkylene; m is a whole number such that $-R'''A'')_m-R'''-$ has a number average molecular weight ($M_n$) from about 100 to about 100,000, especially from about 250 to about 10,000; and x is a whole number from 1 to 10 provided that when Y is other than hydroxyl, x is at least 2. Most preferably, x is 2 or 3. For the purposes of this invention, hydrocarbyl is a monovalent hydrocarbon moiety such as aryl, alkyl, alkenyl and the like. Also, the terminology "each R''' is individually" means that the R''' groups in a particular polymer molecule may be the same or different. A corresponding interpretation applies to the terminologies "each Z is individually" and "each A'' is individually."

The most preferred adducts have polyalkyleneoxy backbones bearing at least one pendant ethylenically unsaturated group represented by the formula:

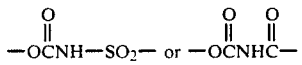

wherein each R is individually hydrogen, alkyl or a comparable insert substituent; M is an ethylenically unsaturated moiety such as

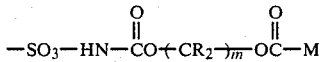

each R' is individually hydrogen, lower alkyl of, for example, about one to about four carbon atoms or

with R'' being an insert group such as alkoxy or polyalkyleneoxy; and m is a whole number, preferably 1 to 6, more preferably 2 to 4, and more preferably 2.

Alternatively, portions of other adducts can be represented by the formulas:

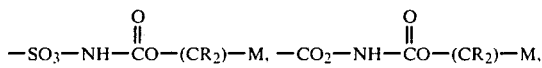

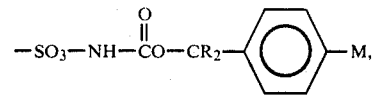

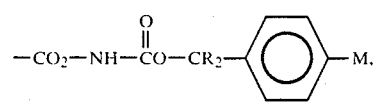

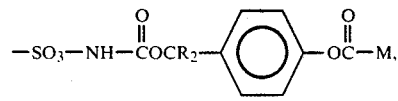

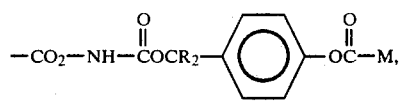

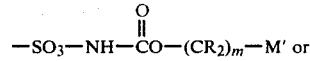

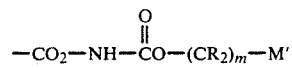

wherein M, R and m are as previously defined, and M' is an acetylenic moiety such as

wherein R' is as previously defined. It is understood that such preferred adducts as previously described are prepared from the correspondingly novel carbamyl monomers.

The adduct of carbamyl monomer and monoahl or polyahl (hereinafter called "mono-adduct") is most advantageously prepared by reacting an active ethylenically unsaturated carbamyl monomer with a monoahl or polyahl under conditions sufficient to cause the

portion of the carbamyl monomer to react with an active hydrogen group of the monoahl or polyahl to form a

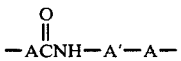

type linkage. That is, the method of preparing the copolymer dispersions of this invention comprises reacting an active carbamyl monomer with a monoahl or polyahl to form a monomeric adduct and copolymerizing the adduct with another ethylenically unsaturated monomer or a mixture of at least two of such other monomers in a polyahl liquid medium which medium is a continuous phase.

Advantageously, when the monoahl is a monool or the polyahl is a polyol the reaction is carried out in the presence of an amine such as triethylamine, pyridine or N,N-dimethylaniline. The conditions employed in carrying out the ester reaction involve maintaining the reaction mixture of the monoahl or polyahl and carbamyl monomer either neat or alternatively dissolved in a non-reactive solvent such as methylene chloride, ethyl acetate, toluene or diethyl ether at a temperature from ambient to reflux in a vessel for a reaction time from a few seconds to about 24 hours. Also suitably employed are reactive solvents such as polyahl or other ethylenically unsaturated monomers. The equivalent ratio of carbamyl monomer to active hydrogen of the polyahl is less than one in order that gelation not occur. In the more preferred embodiments, very low chlorosulfonyl or chlorocarbamyl to active equivalent hydrogen ratios are employed, e.g., less than about 0.2:1, preferably in the range from about 0.2:1 to about 0.001:1, most preferably in the range from about 0.1:1 to about 0.001:1. It is understood that in the case of a monoahl, the carbamyl monomer to active equivalent hydrogen ratio can be significantly higher than the case of the polyahl. If a solvent has been used in the reaction, it can be removed or the composition containing the solvent can be employed as is. Also, the mono-adduct can be blended with additional polyahl.

Another method of preparing the copolymer dispersions of this invention comprises copolymerizing an active carbamyl monomer with another ethylenically unsaturated monomer or a mixture of at least two of such other monomers and reacting the resulting copolymer with a monoahl or polyahl in excess polyahl to form a polymeric adduct of monoahl or polyahl and copolymer dispersed in polyahl. The adduct of (1) addition copolymer of carbamyl monomer with at least one other ethylenically unsaturated monomer and (2) a monoahl or a polyahl (hereinafter called "poly-adduct") is beneficially prepared by first copolymerizing the carbamyl monomer with other monomer(s) by polymerization techniques described hereinafter and then reacting the copolymer with a monoahl or a polyahl using the procedures and conditions described hereinbefore to react the carbamyl monomer with the monoahl or polyahl.

The mixture of poly-adduct and copolymerizate of mono-adduct and other monomer(s) is readily prepared by physically mixing the components neat or dispersed in polyahl. Alternatively, this mixture can be prepared by subjecting a mixture of monoahl or polyahl, carbamyl monomer and other monomer(s) to conditions sufficient to cause copolymerization and isocyanate/polyahl reaction. The polyahl dispersion containing a mixture of the poly-adduct and/or the copolymerizate with a polymer(s) of other monomer(s) is advantageously made by forming a dispersion of poly-adduct and/or copolymerizate in polyahl by one of the foregoing methods and then adding other monomer(s) and subjecting the resulting formulation to polymerization conditions. It is found that the poly-adduct and/or copolymerizate stabilize the resulting dispersion of polymer much in the same manner as described in U.S. Pat. No. 4,148,840.

Suitable ethylenically unsaturated monomers (so-called other monomers or other ethylenically unsaturated monomers), which are copolymerized to form copolymers with the monomeric adduct and/or the reactive monomer, include aliphatic conjugated dienes such as butadiene and isoprene; monovinylidene aromatic monomers such as styrene, $\alpha$-methyl styrene, ar-methyl styrene, ar-(t-butyl)styrene, ar-chlorostyrene, ar-cyanostyrene and ar-bromostyrene; $\alpha,\beta$-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; $\alpha,\beta$-ethylenically unsaturated nitriles and amides such as acrylonitrile, methacrylonitrile, acrylamide, methacrylamide, N,N-dimethyl acrylamide, N-(dimethylaminomethyl) acrylamide, and the like; vinyl esters such as vinyl acetate; vinyl ethers; vinyl ketones; vinyl and vinylidene halides as well as a wide variety of other ethylenically unsaturated materials which are copolymerizable with the aforementioned monomeric adduct or reactive monomer, many of which have heretofore been employed in the formation of copolymer polyols as described in U.S. Pat. Nos. 3,823,201 and 3,383,351. It is understood that mixtures of two or more of the aforementioned monomers are also suitably employed in making the copolymer. Of the foregoing monomers, the monovinylidene aromatic monomers, particularly styrene, and the ethylenically unsaturated nitriles, particularly acrylonitrile, are especially preferred.

The amount of other ethylenically unsaturated monomer(s) employed in the copolymerization reaction is generally an amount sufficient to provide good reinforcement in polyurethane polymers and cell opening in polyurethane foams. Preferably, the amount of other unsaturated monomer(s) is from about 1 to about 70, more preferably from about 5 to about 50, most preferably from about 10 to about 40, weight percent based on the weight of the copolymer dispersion. The amount of the mono-adduct employed in the copolymerization reaction is an amount sufficient to produce a stable dispersion and provide particle size control. Preferably, the amount of the mono-monomeric adduct employed is in the range from about 0.01 to about 50, more preferably from about 0.05 to about 25, most preferably from about 0.1 to about 15, weight percent based on the weight of the copolymer dispersion.

The copolymerization is readily carried out by simultaneously adding at a steady or constant rate monomer(s) and a free radical catalyst to the unsaturated monoahl or unsaturated polyahl or a mixture of the unsaturated monoahl or polyahl and the polyahl under conditions sufficient to cause free radical addition polymerization. The temperature of the copolymerization is dependent upon the initiator and is preferably in the range from about 25° to about 190° C., most preferably from about 110° to about 130° C., when azo-type catalysts are used. Alternatively, the free radical catalyst may be dispersed in a portion of the polyahl and thereafter added along with monomer to the unsaturated monoahl or unsaturated polyahl. Other polymerization processes, both continuous and batch, may be suitably employed.

Suitably, the concentration of polymerization catalyst is any amount sufficient to cause copolymerization of the monomeric adduct and the ethylenically unsaturated monomer(s). Preferably, however, the concentration of catalyst is in the range from about 0.1 to about 20, more preferably from about 0.5 to about 5, weight percent based on the weight of the other monomer(s).

Catalysts suitably employed in the practice of the copolymerization are free radical type polymerization catalysts such as the peroxides, persulfates, perborates, percarbonates, azo compounds and the like. Examples of such catalysts include hydrogen peroxide, di(t-butyl)-peroxide, t-butyl peroctoate, lauroyl peroxide, cumene hydroperoxide, t-butyl hydroperoxide, azobis-(isobutyronitrile) as well as mixtures of such catalysts. Of the foregoing catalysts, azobis(isobutyronitrile) and peroxy esters such as t-butyl peroctoate and t-butyl perbenzoate are preferred.

In addition to the foregoing catalysts, chain transfer agents such as mercaptans, e.g., dodecanethiol, and carbon tetrahalides such as carbon tetrachloride may be employed in conventional amounts to control molecular weight of the copolymerizate.

An especially preferred dispersion is one wherein the polyahl is a polyether polyol, the monoahl is a polyether monool, the reactive carbamyl monomer is methacryloxyethyl-N-(chlorosulfonyl)carbamate or acryloxyethyl-N-(chlorosulfonyl)carbamate, and the other ethylenically unsaturated monomer or a mixture of at least two of such other monomers is a monovinylidene aromatic, an ethylenically unsaturated carboxylic acid, an ethylenically unsaturated nitrile, an alkyl ester of an ethylenically unsaturated carboxylic acid, a vinyl halide, a vinylidene halide or a mixture of two or more thereof.

The resulting copolymer dispersion is readily reacted with an organic polyisocyanate to form desired polyurethane products using conventional polyurethane reaction conditions and procedures. Such reaction and procedures are optionally carried out in the presence of additional polyahls, chain extending agents, catalysts, surface active agents, stabilizers, blowing agents, fillers and pigments. In the preparation of foamed polyurethane, suitable procedures for the preparation of same are disclosed in U.S. Pat. No. Re. 24,514, which is incorporated herein by reference. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the graft copolymer dispersion of the present invention to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride and methylene chloride may be used as blowing agents.

The foams may also be prepared by the froth technique as described in U.S. Pat. Nos. 3,755,212; 3,849,156 and 3,821,130 which are also incorporated herein by reference.

Organic polyisocyanates which may be employed include aromatic, aliphatic and cycloaliphatic polyisocyanates and combinations thereof. Representative of these types are the diisocyanates such as m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4-diisocynate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate, the triisocyanates such as 4,4',4"-triphenylmethane triisocyanate, polymethylene polyphenylisocyanate and tolylene-2,4,6-triisocyanate; and the tetraisocyanates such as 4,4'-dimethyldiphenylmethane-2,2',5,5'-tetraisocyanate. Especially useful due to their availability and properties are tolylene diisocyanate, diphenylmethane-4,4'-diisocyanate and polymethylene polyphenylisocyanate.

Crude polyisocyanate may also be used in the practice of the present invention, such as crude toluene diisocyanate obtained by the phosgenation of a mixture of toluene diamines or crude diphenylmethylene diisocyanate obtained by the phosgenation of crude diphenylmethylenediamine. The preferred undistilled or crude isocyanates are disclosed in U.S. Pat. No. 3,215,652.

The copolymer dispersions of this invention are preferably employed in combination with other polyahl(s) commonly employed in the art. Accordingly, any of the polyahls which are described above for use in the preparation of the polymer dispersions of the present invention may be employed.

Chain-extending agents which may be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols or mixtures thereof. A preferred group of chain-extending agents includes water and primary and secondary aromatic diamines which react more readily with the isocyanate than does water such as phenylenediamine, bis(3-chloro-4-aminophenyl)methane, 2,4-diamino-3,5-diethyl toluene, trisecondary butanolamine, isopropanolamine, diisopropanolamine, N-(2-hydroxypropyl)ethylenediamine, and N,N'-di(2-hydroxypropyl)ethylenediamine.

The urethane reaction of polyisocyanate with the copolymer dispersion is advantageously carried out in the presence of an amount of urethane-type catalyst which is effective to catalyze reaction of the polyahl of the copolymer dispersion with the polyisocyanate. Preferably, the amount of urethane catalyst is an amount comparable to that used in conventional urethane-type reactions.

Any suitable urethane catalyst may be used including tertiary amines, such as for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropyl amine, N,N-dimethyl-N',N'-methyl isopropyl propylenediamine, N,N-diethyl-3-diethylaminopropyl amine, dimethyl benzyl amine and the like. Other suitable catalysts are, for example, tin compounds such as stannous chloride, tin salts of carboxylic acids such as dibutyltin di-2-ethyl hexoate, as well as other organometallic compounds such as are disclosed in U.S. Pat. No. 2,846,408.

A wetting agent(s) or surface-active agent(s) is generally necessary for production of high grade polyurethane foam according to the present invention, since in the absence of same, the foams collapse or contain very large uneven cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkyl sulfonic esters and alkyl arylsulfonic acids.

The following examples are given to illustrate the present invention and are not to be construed as limiting the scope thereof in any manner. All parts and percentages are by weight unless otherwise indicated.

EXAMPLE 1

The $\beta$-methacryloxyethyl chlorosulfonyl carbamate is prepared as follows. Into a 500-ml, 3-neck, round-bottom flask fitted with a reflux condenser, stir bars, and addition funnel is added 28.2 g (0.26 mole) chlorosulfonylisocyanate in 60 ml benzene. Then, 26 g (0.2 mole) hydroxyethylmethylmethacrylate in 30 ml benzene is added over a one-half hour period. After purging the system with nitrogen for 24 hours, a clear light brown liquid is obtained.

EXAMPLE 2

The mono-adduct is prepared as follows. Into a 1-liter, 3-neck flask fitted with reflux condenser, stir bar, and addition funnel is added 200 g (0.07 mole) monool, 8.0 g (0.07 mole) triethylamine and 400 ml dichloromethane. This is heated to reflux and 21 g (0.07 mole) of the carbamyl monomer prepared above is diluted in 25 ml dichloromethane and added over a 45-minute period. After refluxing for an additional 45 minutes, the solvent is removed to give a cloudy gold solution. Next, 300 ml anhydrous ethyl ether is added and the mixture filtered. After stripping the ether, a clear gold colored liquid is obtained.

EXAMPLE 3

A polystyrene dispersion in polyether polyol is prepared as follows. Into a 2-liter, 3-neck, round-bottom flask fitted with a reflux condenser, mechanical stirrer, thermometer, and addition funnel, is added 500 g (0.1 mole) polyol and 17.0 g (0.006 mole) carbamyl monomer. This is stirred and heated to 120° C. and a solution of 2.6 g azobisisobutyronitrile dissolved in 129 g (1.27 moles) styrene is added over a 1-hour period. After one additional hour of heating and two hours of stripping at 1 mm (120° C.), the resulting mixture is a light brown milky dispersion.

What is claimed is:

1. An ethylenically unsaturated N-(halosulfonyl)carbamyl monomer, wherein said halo radical is selected from the group consisting of the chloro, fluoro, and bromo radicals, which is the reaction product of an ethylenically unsaturated compound having at least one active hydrogen moiety and a halosulfonylisocyanate; wherein the mole ratio of isocyanate to the active hydrogen moiety is 1:1.

2. A carbamyl monomer represented by the formula

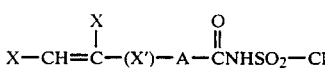

wherein each X is individually hydrogen, lower alkyl, halo-substituted alkyl or aryl, wherein said halo radical is selected from the group consisting of the chloro, fluoro, and bromo radicals; X' is a suitable alkylene or arylene connecting fragment; and A is —O—.

3. A carbamyl monomer of claim 1 wherein said monomer is an ethylenically unsaturated N-(chlorosulfonyl)carbamate.

* * * * *

UNITED STATES PATENT AND TRADEMARK OFFICE
CERTIFICATE OF CORRECTION

PATENT NO. : 4,663,475

DATED : May 5, 1987

INVENTOR(S) : Thomas E. Fisk

It is certified that error appears in the above-identified patent and that said Letters Patent is hereby corrected as shown below:

Col. 1, line 21, "droxyl the moieties" should read --droxyl groups as the moieties --.

Col. 3, line 68, "arylene" should read -- aryl --.

Col. 4, line 1, "aryl" should read -- arylene --.

Col. 4, line 66, "A is as" should read -- wherein A is as --.

Col. 5, line 10, " Y--(R'''A''-mR'''-Z]$_x$ " should read -- Y$[$(R'''A''$)$mR'''-Z]$_x$ --.

Col. 5, line 37, "that -R'''A'')$_m$" should read -- that $($R'''A''$)_m$ --.

Col. 6, line 6, "insert" should read -- inert --.

Col. 6, line 8, "more" should read -- most --.

Signed and Sealed this

Twenty-second Day of December, 1987

Attest:

DONALD J. QUIGG

Attesting Officer

Commissioner of Patents and Trademarks